Dec. 18, 1934.  J. H. FOX  1,984,923
ADJUSTABLE LIP FOR GLASS MELTING TANKS
Filed Nov. 11, 1932    3 Sheets-Sheet 1
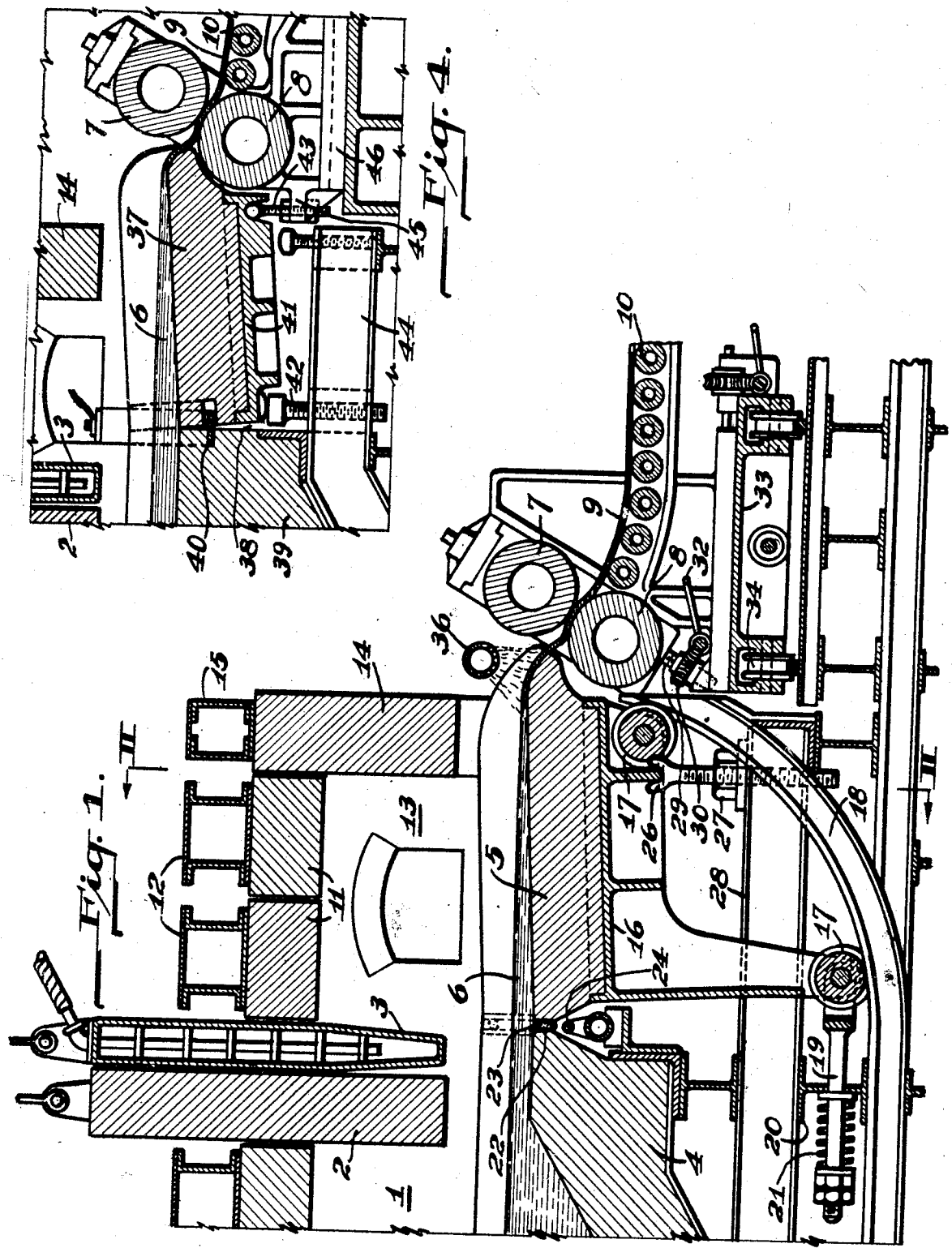
INVENTOR
John H. Fox
By
Bradley & Bee
attys Dec. 18, 1934.     J. H. FOX     1,984,923
ADJUSTABLE LIP FOR GLASS MELTING TANKS
Filed Nov. 11, 1932     3 Sheets-Sheet 2
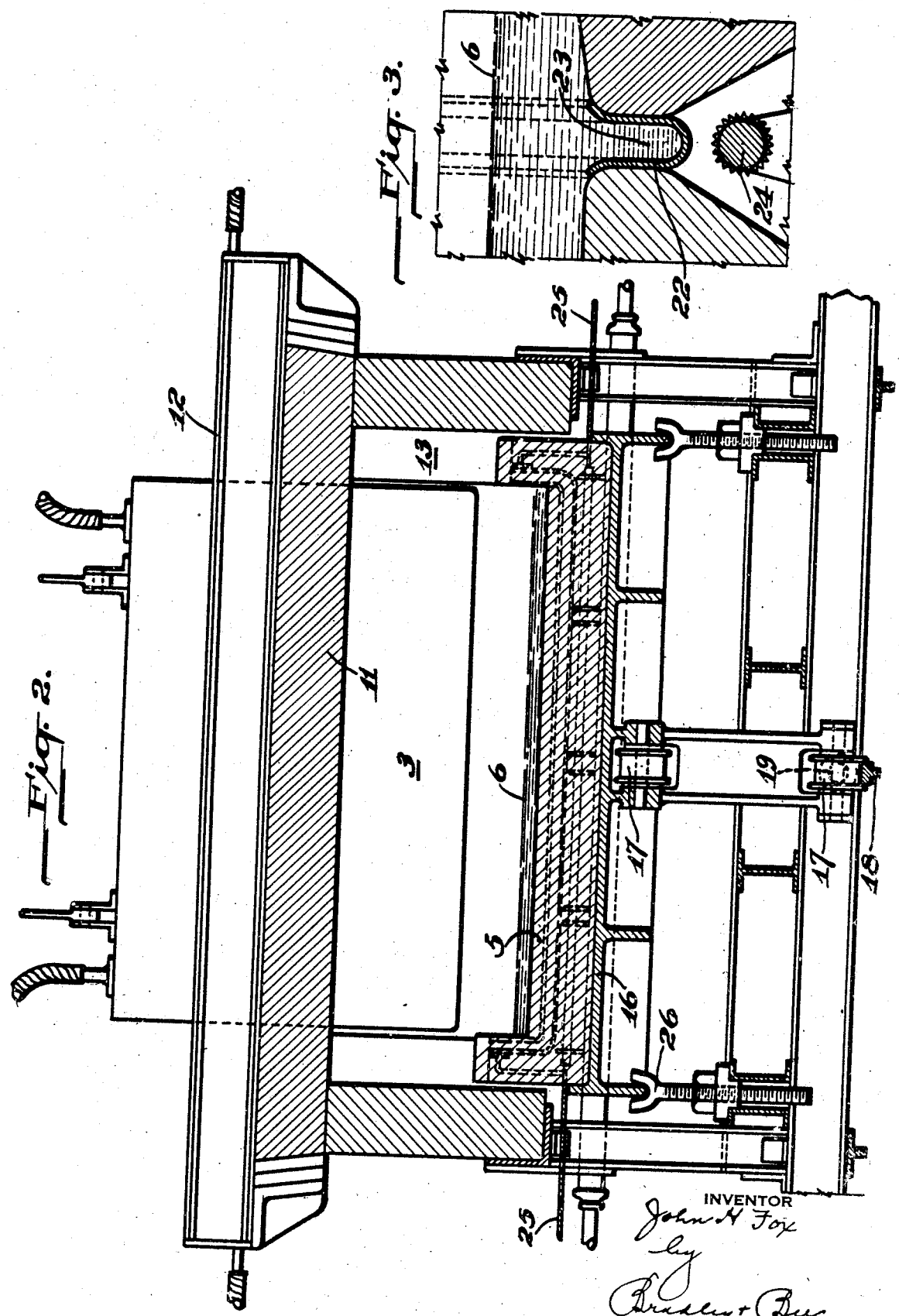

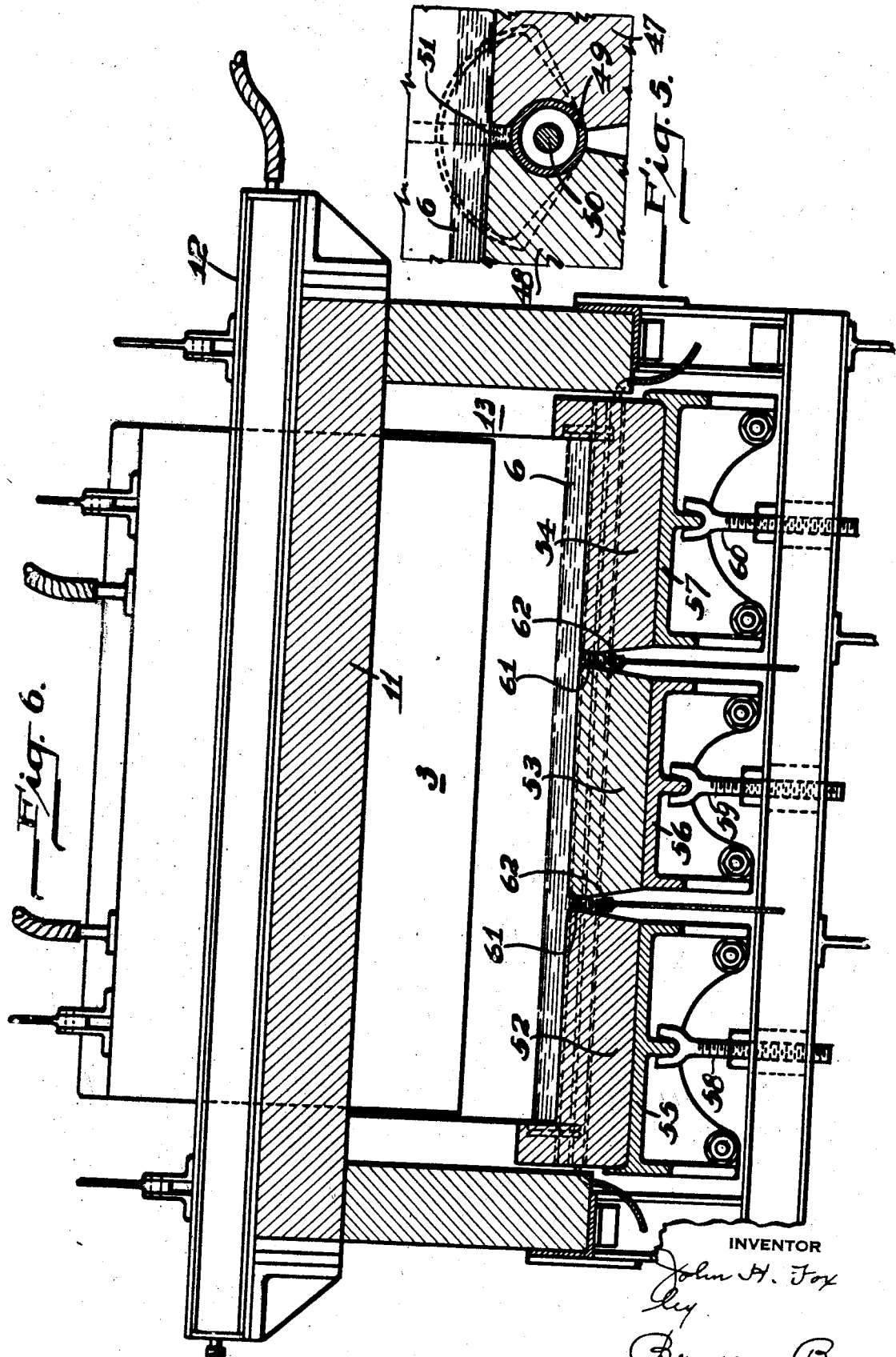

Patented Dec. 18, 1934

1,984,923

UNITED STATES PATENT OFFICE 1,984,923

ADJUSTABLE LIP FOR GLASS MELTING TANKS

John H. Fox, Pittsburgh, Pa., assignor to Pittsburgh Plate Glass Company, a corporation of Pennsylvania Application November 11, 1932, Serial No. 642,257

13 Claims. (Cl. 49—33)

The invention relates to glass melting apparatus and particularly to means for regulating the flow from such tanks. One of the principal applications of the process is in connection with the formation of plate glass in a continuous sheet or ribbon in which the glass as it flows from the tank is passed between sizing or forming rolls which reduce it to an exact thickness. In this operation it is desirable to keep the depth of the layer of glass flowing to the rolls constant regardless of the fluctuations of the level in the tank, and to regulate such depth in accordance with the different thicknesses of sheet which it is desired to make. The principal object of the invention is to provide an improved construction for regulating the flow of the glass without resorting to gates or similar devices which engage the upper surface of the stream of glass and which impair its quality due to such engagement. Certain embodiments of the invention are illustrated in the accompanying drawings, wherein:

Figure 1 is a vertical section through the front end of a glass melting tank equipped with the invention. Fig. 2 is a section on the line II—II of Fig. 1. Fig. 3 is an enlarged detail section. Fig. 4 is a partial section corresponding to that of Fig. 1 showing a modification. Fig. 5 is an enlarged detail section of a modification. And Fig. 6 is a transverse section through a tank having a divided hearth construction.

Referring to Figs. 1, 2 and 3, 1 is the outlet end of a glass melting tank provided with the usual shade stone 2 and cut off gate 3, operated from above. Abutting the end wall 4 of the tank is a hearth or lip 5, over which a shallow stream of glass 6 flows to the forming rolls 7 and 8. The forming rolls are suitably driven and water cooled and determine the size of the sheet 9 passing therebetween, such sheet being carried over the apron rolls 10 and into the leer, which is not shown. The hearth 5 is covered by the blocks 11 supported from above by the beams 12 and the front end of the space 13 above the hearth is closed by the wall member 14, also supported from above by means of a beam 15.

The hearth 5, which is of refractory material, such as clay is supported upon a cast metal framework 16, such framework being provided with wheels 17 riding upon the inclined tracks 18. The hearth thus tends to move by gravity toward the left and is further pulled in this direction by means of a pair of arms 19 passing through the supporting beams 20 and carrying the springs 21 which are under substantial tension. The block 5 is thus pressed yieldingly to the left toward the end of the block 4 so that there is no tendency of these blocks to separate when the hearth is adjusted up and down, as later described.

In order to provide a seal at the joint between the blocks 4 and 5, the U-shaped metal member 22 is employed, such member being preferably of the heat resisting metal. This member is normally filled with a body of glass 23 which freezes or hardens, making a tight joint at this point so that there is no leakage of glass. When it becomes necessary to adjust the hearth 5, it is desirable to melt the body of glass 23 lying within the member 22 and this is preferably accomplished by applying heat from beneath. The heating means, as shown, is a heating resistance bar 24 of carbon or other suitable material through which a current of electricity is passed from the lead wires 25 (Fig. 2). Any other suitable heating means might be provided for accomplishing the heating function, and the current supplied to the bar 24 may also be passed through the member 22. It is intended that either one or both of these expedients may be employed for softening the glass lying within the member 22.

In order to adjust the angle of the hearth 5, a pair of screws 26, working through the nuts 27 carried by the beams 28 forming a part of the framework beneath the tank, are provided. The screw members are forked at their upper ends and engage one of the ribs of the framework 16. By this means the hearth is swung up and down to vary the depth of glass flowing to the rolls. This adjustment may occur when the level of the glass in the tank varies or when the adjustment of the rolls is changed to roll a thicker or thinner sheet. In order to compensate for the vertical adjustment of the hearth 5, the rolls are also made adjustable. This is preferably accomplished by means of screw members 29 which engage the roll housings and are moved up and down by the worm wheels 30, such worm wheels being rotated by means of worms 31 on a transverse shaft having an operating handle 32. The framework 33 which supports the rolls is also preferably mounted upon wheels 34 which engage a track 35, thus permitting the rolls to be moved into and out of position. The burner 36, placed above the outer end of the hearth 5, serves to regulate the temperature of the glass passing to the rolls.

Fig. 4 illustrates a modification involving the same principle of a tilting hearth 37 for regulating the flow of glass passing between the rolls 7 and 8. In this instance, the joint 38 between the hearth 37 and the block 39 is sealed by means of a flat plate 40 of heat resisting metal which lies in opposing slots in the ends of the two blocks. This plate is preferably heated by means of electric current in the same manner as described in connection with the seal 22 of the Fig. 1 construction. In this construction, the framework 41 which carries the refractory hearth 37 is adjusted by means of the screws 42, 43, the screws 42 being carried by the fixed framework 44 forming a part of the tank construction, while the screws 43 are supported upon the lugs 45 projecting from the framework 46 which carries the rolls 7 and 8. The screws 43 not only serve to adjust the position of the hearth 37 but also serve to hold such hearth against endwise movement and prevent the slot 38 from opening up to too great an extent. In operation some glass necessarily flows down into the slot above the plate 40 and hardens, forming a seal, which may be readily melted out by heating the plate 40 when it is desired to adjust the position of the hearth 37 up or down.

Fig. 5 illustrates a further modification at the joint between the rear end of the hearth 47 and the end lock 48 of the tank. The sealing member here employed is a pipe 49 of heat resisting metal which acts as a pivot around which the hearth 47 tilts. The seal may be heated by means of a resistance bar 50 through which a current of electricity is passed. This serves to melt the glass 51 forming the seal when it is desired to adjust the hearth up and down to vary the depth of the stream of glass flowing thereover.

Fig. 6 illustrates a modification which involves a feature of dividing the swinging hearth longitudinally into three sections 52, 53 and 54 to permit of the regulation of the depth of the stream of glass at different points across its width, as under certain conditions, this may be desirable. In order to accomplish this result, the sections 52, 53 and 54 are supported in separate frames 55, 56 and 57 which are independently adjustable by means of the screws 58, 59 and 60 engaging ribs on the under sides of the frames. These screws correspond to the screws 26 of the Fig. 1 construction and are similarly located adjacent the front end of the hearth. In order to seal the joints between the edges of the sections 52 and 53, and 53 and 54, the U-shaped members 61, 61 are employed, such U-shaped members being similar to those heretofore described in connection with Figs. 1, 2 and 3. Heaters 62, 62 are provided, corresponding in function to that of the heater 24 of Fig. 3. In other respects this construction is similar to that of Figs. 1, 2 and 3.

What I claim is:

1. The combination with a glass melting tank having an outlet at one end and a pair of sizing rolls in opposition to said outlet of a refractory hearth constituting the lower wall of said outlet and having one end pivotally mounted within the tank for swinging movement in a vertical direction with the free end in position to discharge the glass flowing thereover to the rolls and means for adjusting the hearth and the rolls.

2. The combination with a glass melting tank having an outlet at one end, of a refractory hearth constituting the lower wall of such outlet and mounted for swinging movement vertically about its rear edge, a seal of heat resisting metal at the joint between the hearth and the bottom wall of the tank against which it abuts, and means for adjusting the hearth so as to regulate the depth of the stream of glass flowing thereover.

3. The combination with a glass melting tank having an outlet at one end, of a refractory hearth constituting the lower wall of such outlet and mounted for swinging movement vertically about its rear edge, a seal of heat resisting metal at the joint between the hearth and the bottom wall of the tank against which it abuts, means for applying heat to said seal, and means for adjusting the hearth so as to regulate the depth of the stream of glass flowing thereover.

4. The combination with a glass melting tank having an outlet at one end, of a refractory hearth constituting the lower wall of such outlet and mounted for swinging movement vertically about its rear edge, a seal of heat resisting metal at the joint between the hearth and the bottom wall of the tank against which it abuts, means for heating said seal electrically, and means for adjusting the hearth so as to regulate the depth of the stream of glass flowing thereover.

5. The combination with a glass melting tank having an outlet at one end, of a refractory hearth constituting the lower wall of such outlet and mounted for swinging movement vertically about its rear edge, a seal of heat resisting metal at the joint between the hearth and the bottom wall of the tank against which it abuts, means for passing a current of electricity through said seal to heat it, and means for adjusting the hearth so as to regulate the depth of the stream of glass flowing thereover.

6. The combination with a glass melting tank having an outlet at one end, of a refractory hearth constituting the lower wall of such outlet and mounted for swinging movement vertically, a seal of heat resisting metal of U cross section at the joint between the hearth and the bottom wall of the tank against which it abuts, and means for adjusting the hearth so as to regulate the depth of the stream of glass flowing thereover.

7. The combination with a glass melting tank having an outlet at one end, of a refractory hearth constituting the lower wall of such outlet and mounted for swinging movement vertically, a seal of heat resisting metal of U cross section at the joint between the hearth and the bottom wall of the tank against which it abuts, means for applying heat to said seal from beneath, and means for adjusting the hearth so as to regulate the depth of the stream of glass flowing thereover.

8. The combination with a glass melting tank having an outlet at one end, of a refractory hearth constituting the lower wall of such outlet and mounted for swinging movement vertically, a seal of heat resisting metal of U cross section at the joint between the hearth and the bottom wall of the tank against which it abuts, means for passing an electric current through said seal to heat it, and means for adjusting the hearth so as to regulate the depth of the stream of glass flowing thereover.

9. The combination with a glass melting tank having an outlet at one end, of a refractory hearth constituting the lower wall of such outlet and mounted for swinging movement vertically about its rear edge, a seal of heat resisting metal at the joint between the hearth and the bottom wall of the tank against which it abuts, means for yieldingly pressing the hearth into abutting relation with said bottom wall, and means for adjusting the hearth up and down so as to regulate the stream or glass flowing thereover.

10. The combination with a glass melting tank having an outlet at one end, of a refractory hearth constituting the lower wall of such outlet and mounted for swinging movement vertically about its rear edge, a pipe between such edge and the end of the bottom wall which acts as a pivot for the hearth, and means for adjusting the hearth about such pivot.

11. The combination with a glass melting tank having an outlet at one end, of a refractory hearth constituting the lower wall of such outlet and mounted for swinging movement vertically about its rear edge, a pipe between such edge and the end of the bottom wall which acts as a pivot for the hearth, a heater in the pipe, and means for adjusting the hearth about such pivot.

12. The combination with a glass melting tank having an outlet at one end, of a refractory hearth constituting the lower wall of such outlet and mounted for swinging movement vertically, said hearth being divided longitudinally into a plurality of sections, and means for adjusting the sections of the hearth independently to regulate the depth of the stream of glass flowing thereover.

13. The combination with a glass melting tank having an outlet at one end and a pair of sizing rolls in opposition to said outlet of a refractory hearth constituting the lower wall of said outlet and mounted for movement in a vertical direction within the tank with the outer end in position to discharge the glass flowing thereover to the rolls, and means for adjusting the hearth and rolls vertically.

JOHN H. FOX.